Dec. 23, 1930. W. GRIBBEN 1,785,812
WHEEL FOR RAILWAY ROLLING STOCK
Filed April 8, 1929 2 Sheets-Sheet 1
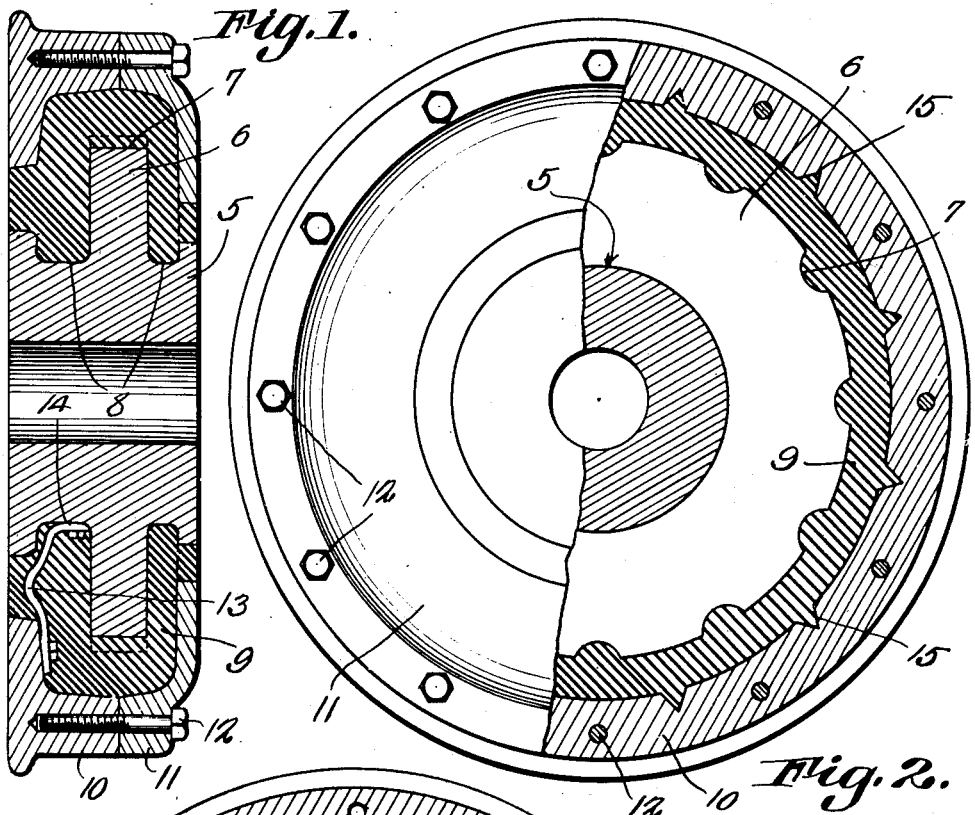
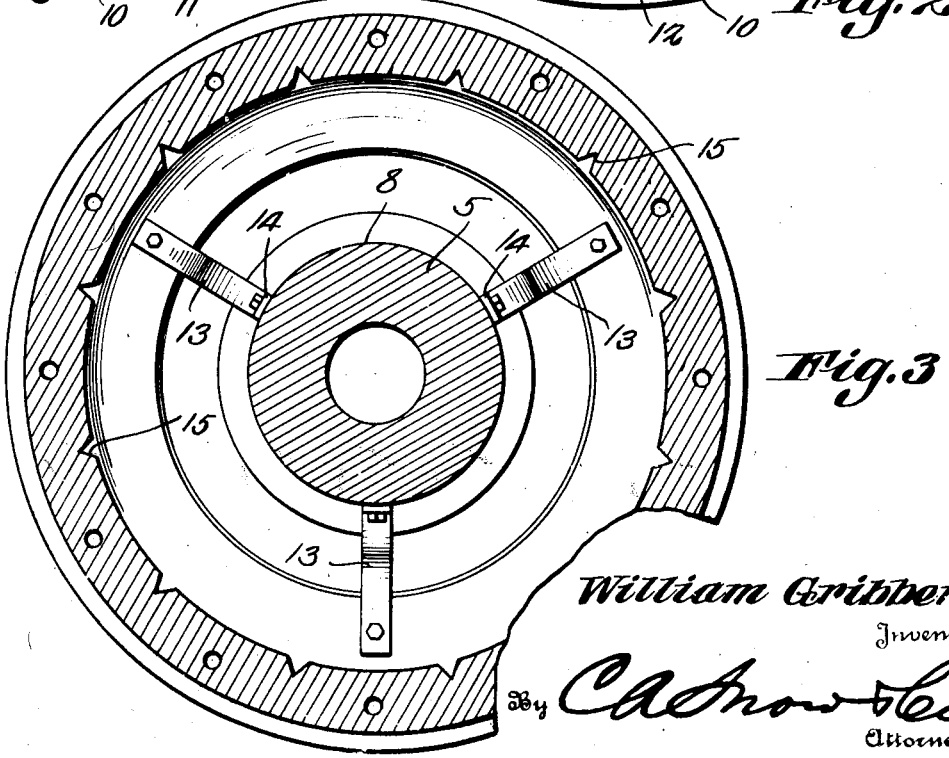
William Gribben
Inventor Dec. 23, 1930.  W. GRIBBEN  1,785,812
WHEEL FOR RAILWAY ROLLING STOCK
Filed April 8, 1929  2 Sheets-Sheet 2

William Gribben
Inventor
By C. A. Snow & Co.
Attorneys.

Patented Dec. 23, 1930

1,785,812

UNITED STATES PATENT OFFICE

WILLIAM GRIBBEN, OF DETROIT, MICHIGAN

WHEEL FOR RAILWAY ROLLING STOCK

Application filed April 8, 1929. Serial No. 353,644.

This invention relates to wheel construction, and more particularly to wheels especially designed for use in connection with railway rolling stock.

The primary object of the invention is to provide a wheel which will be practically noiseless, due consideration being given to the construction of the wheel to insure the same being strong and durable.

A further object of the invention is to provide a wheel including an outer section and an inner section, the sections of the wheel being spaced apart by a suitable flexible material such as rubber, to lend resiliency to the wheel reducing strain on the car construction to the minimum.

A still further object of the invention is to so construct the wheel sections that the resilient material will be firmly locked to the sections.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a vertical sectional view through a wheel constructed in accordance with the invention.

Figure 2 is a side elevational view of a wheel, a portion thereof being broken away.

Figure 3 is a sectional view taken through the wheel prior to the positioning of the cushioning member.

Figure 4:
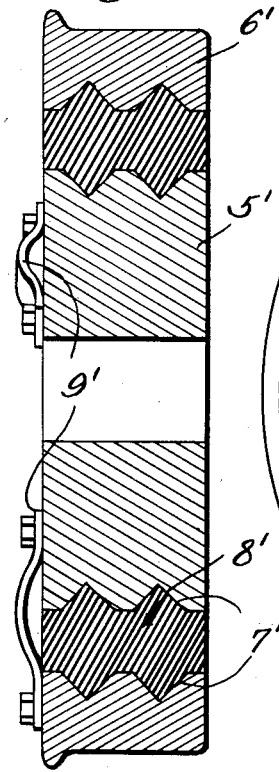
Figure 4 is a vertical sectional view through a modified form of the invention.
Figure 5:
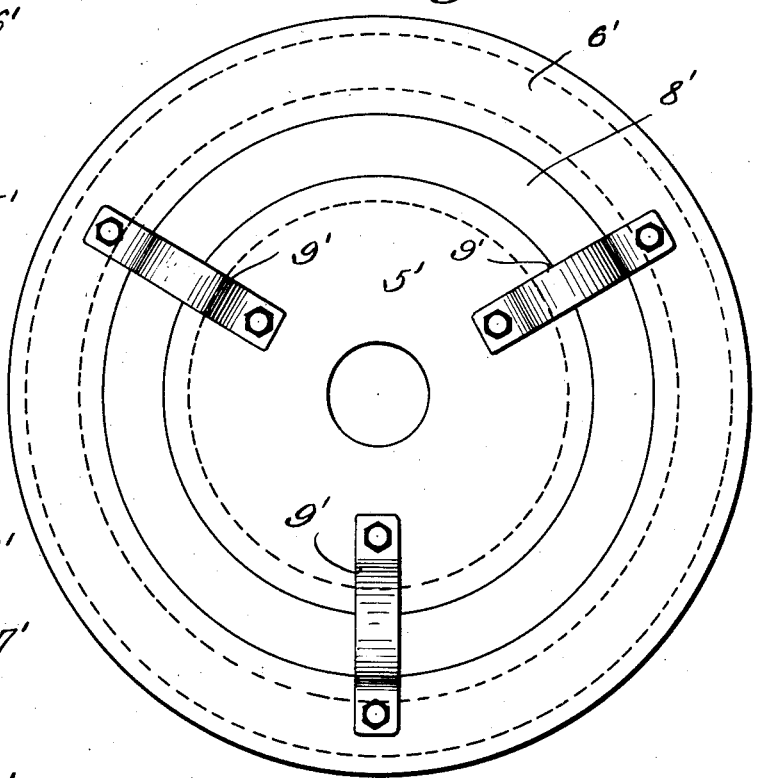
Figure 5 is a side elevational view.

Referring to the drawings in detail, the reference character 5 designates the inner section or hub section of the wheel, the same being provided with a circumferential flange 6 having depressions 7 formed in the periphery thereof.

Grooves 8 are formed in the section 5 adjacent to the flange 6 to hold the cushioning material, which is indicated at 9, and which is in the form of rubber poured into the wheel, after the inner and outer sections thereof have been positioned.

The outer section includes separable members 10 and 11 respectively which are provided with openings to receive the bolts 12 so that the members 10 and 11 may be secured together providing a housing with the inner section of the wheel.

Spring contact members 13 which provide an electrical connection between the members 5 and 10 are bolted to the member 10 and have right angled extremities 14 bolted to the section 5 adjacent to the hub thereof, in a manner as shown by Figure 1 of the drawings. These members 13 are bowed at points intermediate their ends so that they may move longitudinally to compensate for vertical movement of one section of the wheel with respect to the other section caused by the wheel passing over irregularities, or roughened rail surfaces.

The outer sections are also provided with notches 15 into which the resilient material or rubber flows when it is being poured between the sections in the construction of the wheel.

As shown by Figure 4 of the drawings this form of invention includes an inner section 5' and an outer tread section 6', the sections being provided with grooves 7' to receive the rubber or flexible material 8' which fills the space between the outer and inner sections.

Bowed spring contact members 9' are secured to the inner side surfaces of the sections 5' and 6' and provide a ground connection between the sections 5' and 6'.

Figure 6:
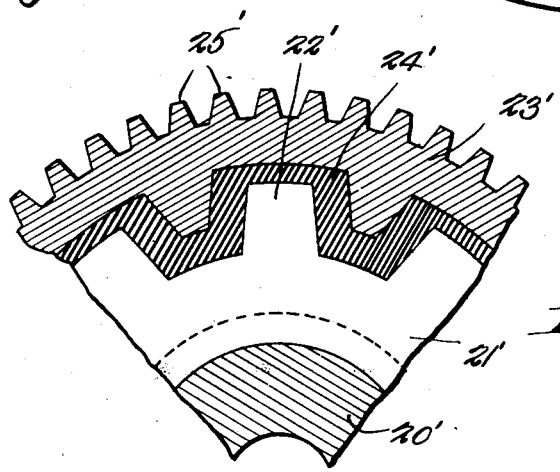
Figure 6 is a fragmental sectional view through a gear wherein the cushioning member is used.
Figure 7:
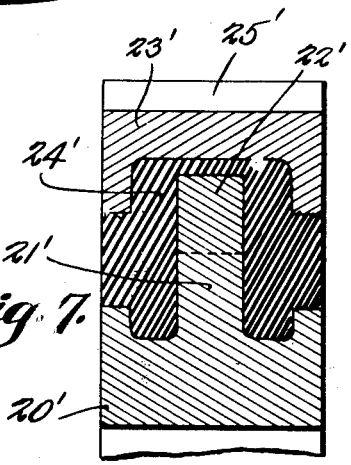
Figure 7 is a sectional view taken at right angles to Figure 6.

The cushioning idea is carried out in the construction of a gear as shown by Figures 6 and 7 of the drawings, in which case the inner section 20' is provided with a flange 21' formed with cut away portions defining extensions 22' that fit within cut away portions formed in the inner periphery of the outer section 23'. The extensions 22' are narrow as compared with the cut away portions, providing a wide space between the extensions and the walls of the cut away portions for the reception of the rubber 24' that is poured between the sections and allowed to cool so that the rubber is firmly secured to the sections of the gear.

Gear teeth 25' are provided on the sections 23'.

I claim:

1. A wheel for railway rolling stock, comprising an inner section and an outer section, the inner section having a circumferential flange, the outer section embodying spaced flanges, said outer section being fitted over the inner section, and a cushioning member contacting with the sides and edge of the flange of the inner section, and engaging the flanges of the outer section.

2. A wheel for railway rolling stock, comprising an inner section and an outer section, a circumferential flange extending from the inner section, said flange having depressions formed in the outer edge thereof, said outer section having lateral flanges, and positioned over the circumferential flange, the latter flanges lying in spaced relation with the circumferential flange, a rubber cushioning member fitted between the flanges of the sections and engaging the outer surfaces of the circumferential flange and inner surfaces of the flanges of the outer section, and a conductor extending through the cushioning member and contacting with the outer and inner sections.

3. A wheel for railway rolling stock, comprising an inner section and an outer section, a circumferential flange formed on the inner section, a cushioning member surrounding the flange, the outer section having spaced flanges and fitted over the inner section, the outer section being spaced from the inner section to permit of movement of the sections with respect to each other, said inner and outer sections having recesses to anchor the cushioning member to the sections, and a conductor connecting the inner and outer sections.

In testimony that I claim the foregoing as my own, I have hereunto affixed my signature.

WILLIAM GRIBBEN.